United States Patent
Fujii et al.

(10) Patent No.: US 9,025,248 B2
(45) Date of Patent: May 5, 2015

(54) ANTIREFLECTION STACK

(71) Applicant: Asahi Glass Company, Limited, Chiyoda-ku (JP)

(72) Inventors: Kensuke Fujii, Chiyoda-ku (JP); Kouji Satou, Chiyoda-ku (JP); Kouta Hori, Chiyoda-ku (JP); Tamotsu Morimoto, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/064,518

(22) Filed: Oct. 28, 2013

(65) Prior Publication Data

US 2014/0049827 A1    Feb. 20, 2014

Related U.S. Application Data

(63) Continuation of application No. PCT/JP2012/061268, filed on Apr. 26, 2012.

(30) Foreign Application Priority Data

Apr. 28, 2011  (JP) .................................. 2011-102038

(51) Int. Cl.
*G02B 1/10* (2006.01)
*G02B 1/11* (2006.01)

(52) U.S. Cl.
CPC . *G02B 1/11* (2013.01); *G02B 1/113* (2013.01)

(58) Field of Classification Search
CPC ............ G02B 1/10; G02B 1/11; G02B 1/113; G02B 1/115; G02B 5/28; G02B 5/285; G02B 5/286
USPC .......... 359/577, 580, 581, 586, 588; 351/159.01, 159.49, 159.55, 159.57, 351/159.6, 159.62, 159.63, 4, 159.64, 351/159.65, 159.73
See application file for complete search history.

(56) References Cited

U.S. PATENT DOCUMENTS

2014/0009835 A1*  1/2014  Shibuya et al. ............... 359/586

FOREIGN PATENT DOCUMENTS

EP    2275843 A1    1/2011
GB    1 221 360      2/1971
(Continued)

OTHER PUBLICATIONS

Extended European Search Report issued Oct. 2, 2014 in Patent Application No. 12776857.0.
(Continued)

*Primary Examiner* — Stephone B Allen
*Assistant Examiner* — Kimberly N Kakalec
(74) *Attorney, Agent, or Firm* — Oblon, McClelland, Maier & Neustadt, L.L.P.

(57) ABSTRACT

An antireflection stack, whereby a reflected color is moderate, and a multicolorization is suppressed. The antireflection stack comprises a substrate and an antireflection layer stacked on the substrate. The antireflection layer has a four-layer structure and comprises, sequentially from the substrate side, a first layer, a second layer, a third layer and a fourth layer. Further, the first layer has a refractive index of from 1.7 to 1.79, the second layer has a refractive index of from 2.25 to 2.45, the third layer has a refractive index of from 2.1 to 2.3, the fourth layer has a refractive index of from 1.25 to 1.5, and the refractive index of the second layer is larger than that of the third layer.

9 Claims, 6 Drawing Sheets

(56) References Cited

FOREIGN PATENT DOCUMENTS

| JP | 7-60855 A | 3/1995 |
|---|---|---|
| JP | 11-183705 | 7/1999 |
| JP | 2002-156507 | 5/2002 |
| JP | 2003-215309 | 7/2003 |
| JP | 2004-138662 | 5/2004 |
| JP | 2005-99757 | 4/2005 |
| JP | 2005-531814 | 10/2005 |
| JP | 2006-289901 | 10/2006 |
| JP | 2008-116611 | 5/2008 |
| JP | 2009-122416 A | 6/2009 |
| WO | WO 2009/001723 A1 | 12/2008 |

OTHER PUBLICATIONS

Japanese Office Action issued Jun. 25, 2013 in Patent Application No. 2013-512443 with English Translation.
International Search Report issued Jul. 31, 2012 in PCT/JP2012/061268 filed Apr. 26, 2012.

* cited by examiner

Thickness-incident angle dependency of reflected color (equivalent to Example 1)

Incident angle dependency of reflected color (equivalent to Example 2)

Fig. 5  Thickness-incident angle dependency of reflected color (equivalent to Example 2)
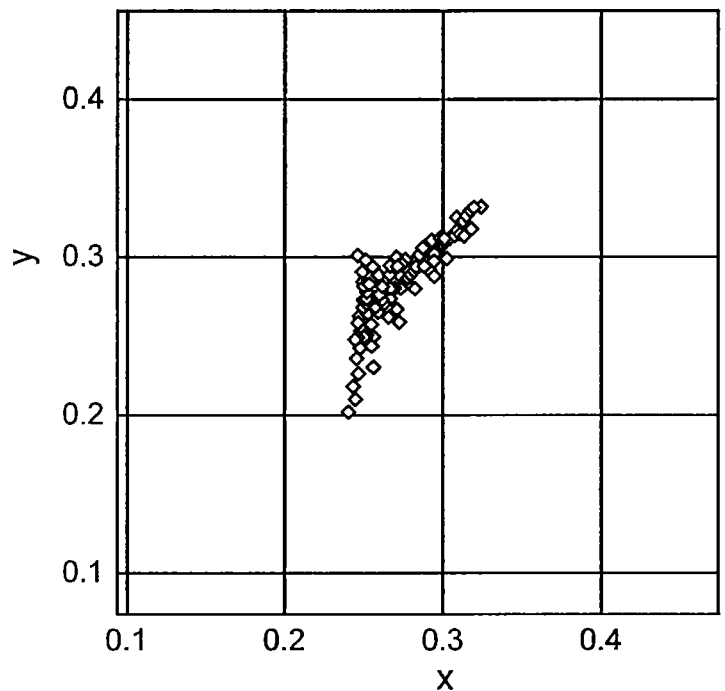
Fig. 6  Incident angle dependency of reflected color (equivalent to Example 3)
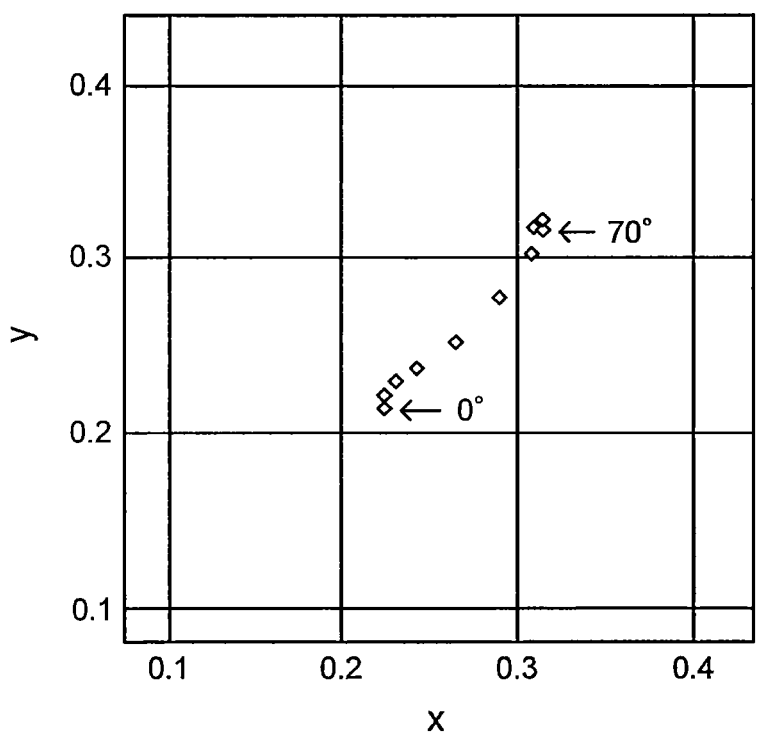

Fig. 7 Thickness-incident angle dependency of reflected color (equivalent to Example 3)
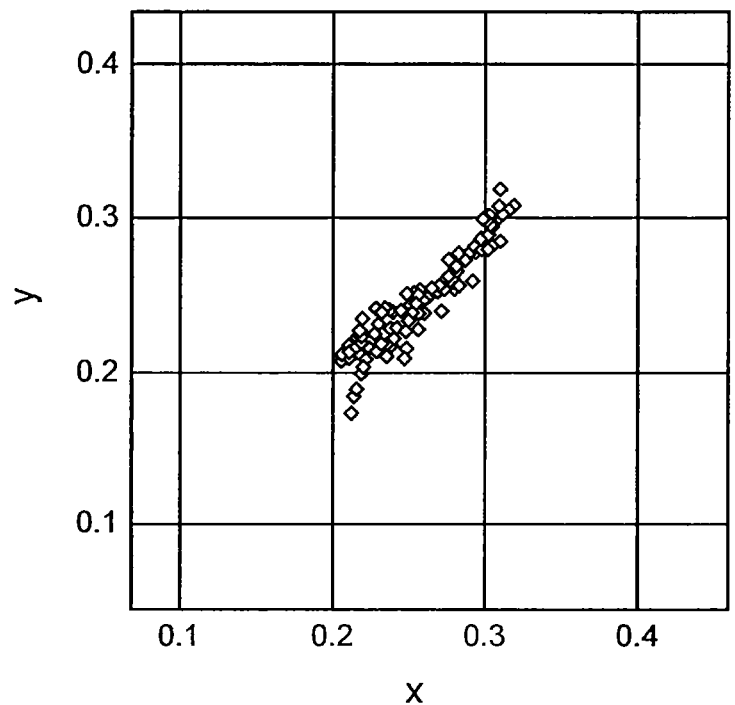
Fig. 8 Incident angle dependency of reflected color (equivalent to Comparative Example 1)
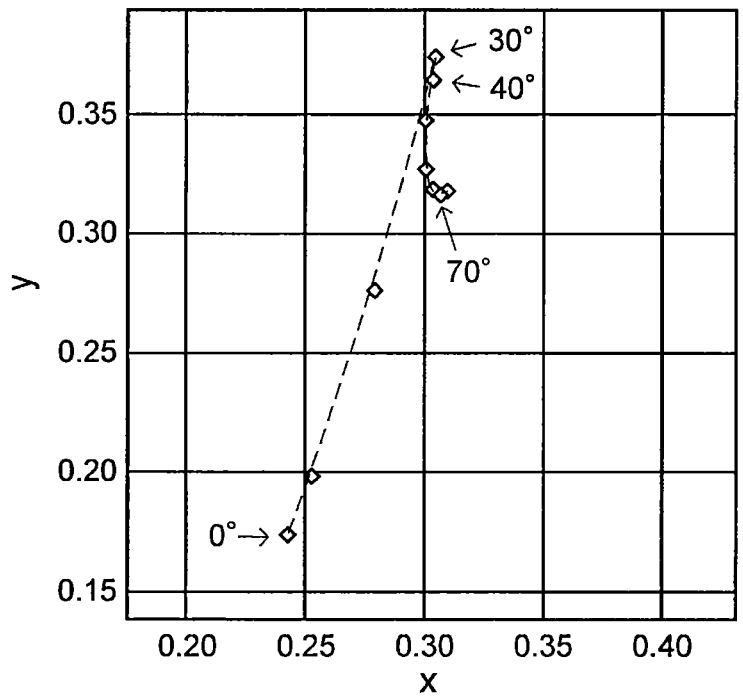

Fig. 9  Thickness-incident angle dependency of reflected color (equivalent to Comparative Example 1)
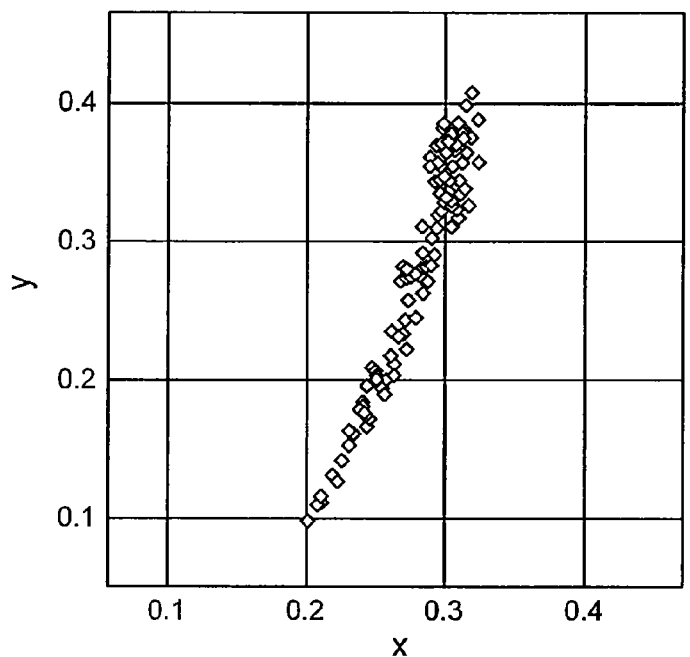
Fig. 10  Incident angle dependency of reflected color (equivalent to Reference Example)
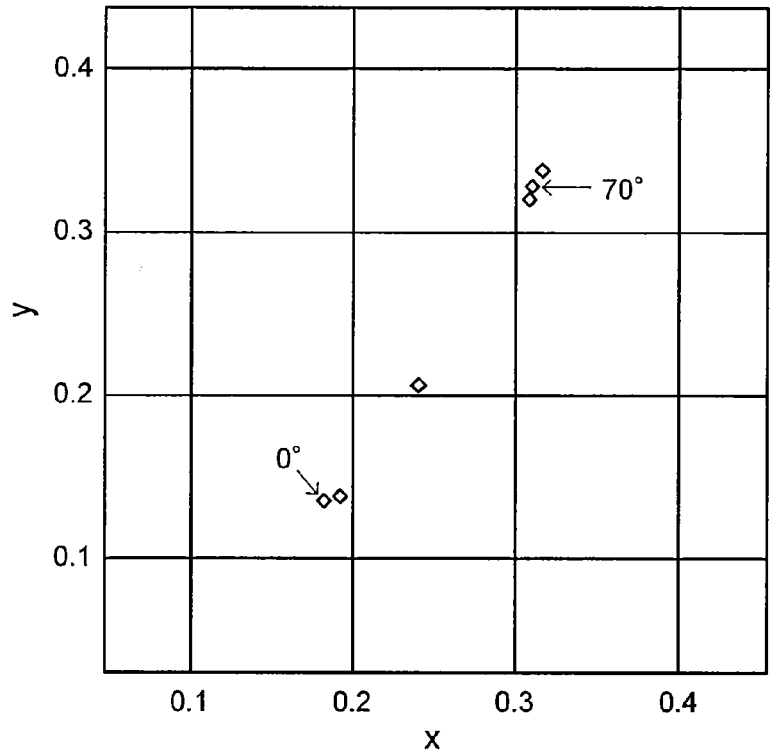

Fig. 11   Thickness-incident angle dependency of reflected color (equivalent to Reference Example)
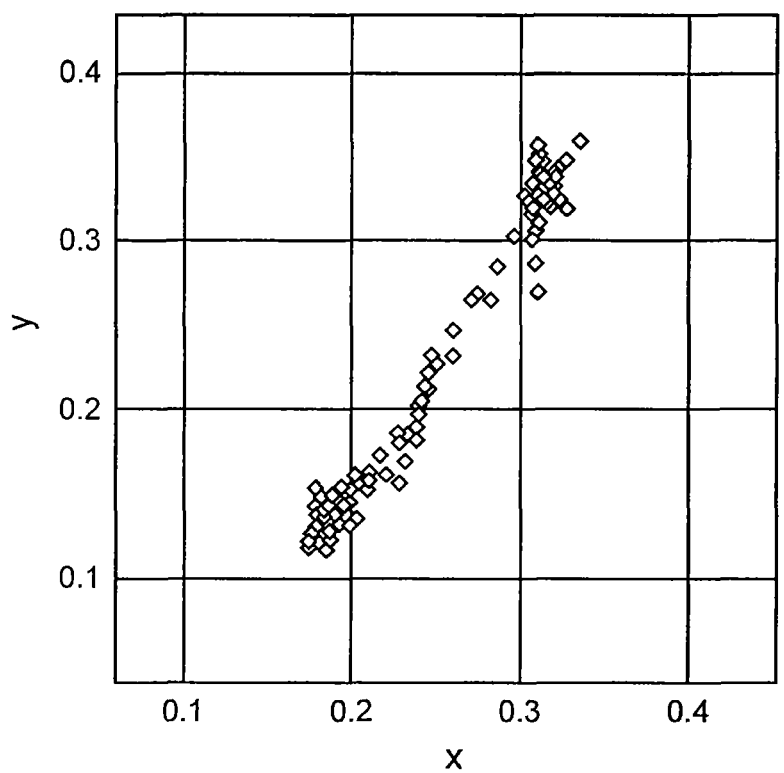

ANTIREFLECTION STACK

TECHNICAL FIELD

The present invention relates to an antireflection stack.

BACKGROUND ART

Heretofore, in order to improve visibility of an image display device, it has been common to provide an antireflection stack such as an antireflection film on the image display surface. The antireflection stack is designed to reduce reflectance over the entire visible light wavelength range, and, for example, one having a high refractive index oxide layer and a low refractive index oxide layer stacked alternately on a transparent substrate, has been known. The number of such high refractive index oxide layers and low refractive index oxide layers to be stacked, is not necessarily limited, but, it is usually about 4 layers as a total number of the high refractive index oxide layers and low refractive index oxide layers, from the viewpoint of the productivity, etc. (e.g. Patent Document 1).

The antireflection stack is required to have, in addition to the low reflectance, abrasion resistance, water resistance, fouling resistance, etc. Further, in order to improve the external appearance of e.g. an image display device having an antireflection stack mounted, the antireflection stack is required to be such that the reflected color has a moderate chromatic color, and a change in the reflected color due to a change in the angle of incidence of light, i.e. so-called multicolorization, is suppressed. Namely, it is required that when viewed from the front, the reflected color has a moderate chromatic color which is not excessively bluish, and when viewed obliquely at an angle, the reflected color has e.g. a white color which is not excessively reddish.

As a stack whereby the reflected color has a moderate chromatic color and a multicolorization is suppressed, such one is, for example, known that comprises a first oxide layer, a second oxide layer and a third oxide layer formed on a substrate, wherein the first oxide layer has a refractive index of from 1.74 to 1.88 and a thickness of from 45 to 65 nm, the second oxide layer has a refractive index of from 1.9 to 2.1 and a thickness of from 90 to 110 nm, and the third oxide layer has a refractive index of at most 1.48 and a thickness of from 80 to 110 nm (e.g. Patent Document 2).

PRIOR ART DOCUMENTS

Patent Documents

Patent Document 1: JP-A-2003-215309
Patent Document 2: JP-A-2006-289901

DISCLOSURE OF INVENTION

Technical Problem

As mentioned above, with respect to a stack having a high refractive index oxide layer and a low refractive index oxide layer alternately stacked, it is known to make the reflected color to be a moderate chromatic color and to suppress a multicolorization by adjusting the refractive indices and thicknesses of the oxide layers to be within certain specific ranges. However, with such a conventional antireflection stack, for example, the reflectance (luminous reflectance) exceeds 0.7%, and it is desired to further reduce the reflectance.

Further, in the case of a stack having a high refractive index oxide layer and a low refractive index oxide layer alternately stacked, the thicknesses of the oxide layers may not necessarily be made to be the desired thicknesses, for example, due to slight differences in the production conditions, whereby the reflected color may not be made to be a moderate chromatic color, and the change in the reflected color tends to be substantial. Therefore, in order to make it possible to produce a product at a constant quality in the actual production, it is desired to develop one whereby the change in the reflected color can be suppressed even when the thicknesses of the layers fluctuate.

The present invention has been made to solve the above problem, and it is an object of the present invention to provide an antireflection stack whereby the reflected color has a moderate chromatic color, and at the same time, the multicolorization is suppressed and the reflectance is also reduced.

Solution to Problem

The antireflection stack of the present invention comprises a substrate and an antireflection layer stacked on the substrate. The antireflection layer has a four-layer structure and comprises, sequentially from the substrate side, a first refractive index layer, a second refractive index layer, a third refractive index layer and a fourth refractive index layer. The first refractive index layer has a refractive index of from 1.6 to 1.9, the second refractive index layer has a refractive index of from 2.2 to 2.5, the third refractive index layer has a refractive index of from 2.0 to 2.3, and the fourth refractive index layer has a refractive index of from 1.2 to 1.5. Further, the refractive index of the second refractive index layer is larger than the refractive index of the third refractive index layer.

Advantageous Effects of Invention

According to the antireflection stack of the present invention, the antireflection layer is made to have a four layer structure, and at the same time, the refractive indices of the respective refractive index layers are adjusted to be within the predetermined ranges, whereby while reducing the reflectance, it is possible to make the reflected color to be a moderate chromatic color and to suppress the multicolorization. Further, even if the thicknesses of the layers fluctuate to some extent, it is possible to substantially prevent a change in the reflected color.

BRIEF DESCRIPTION OF DRAWINGS

FIG. 5 is a graph showing the thickness-incident angle dependency of the reflected color of a product equivalent to Example 2.

FIG. 6 is a graph showing the incident angle dependency of the reflected color of a product equivalent to Example 3.

FIG. 7 is a graph showing the thickness-incident angle dependency of the reflected color of a product equivalent to Example 3.

FIG. 8 is a graph showing the incident angle dependency of the reflected color of a product equivalent to Comparative Example 1.

FIG. 9 is a graph showing the thickness-incident angle dependency of the reflected color of a product equivalent to Comparative Example 1.

FIG. 10 is a graph showing the incident angle dependency of the reflected color of the antireflection stack in Reference Example.

FIG. 11 is a graph showing the thickness-incident angle dependency of the reflected color of the antireflection stack in Reference Example.

DESCRIPTION OF EMBODIMENTS

Now, the antireflection stack of the present invention will be described in detail.

Figure 1:
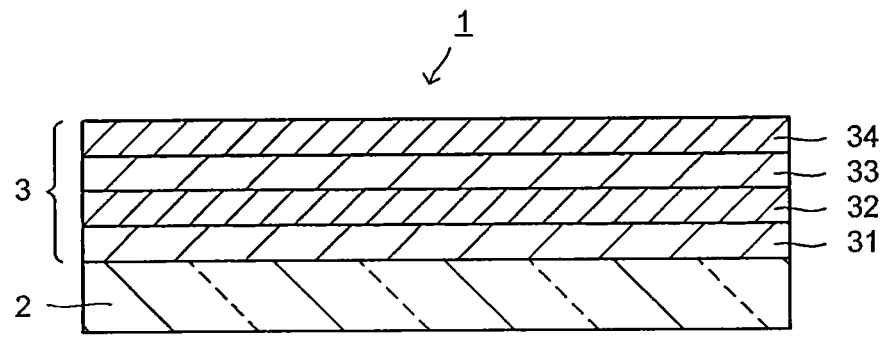
FIG. 1 is a cross-sectional view illustrating an embodiment of the antireflection stack of the present invention.

FIG. 1 is a cross-sectional view illustrating an embodiment of the antireflection stack.

The antireflection stack 1 comprises, for example, a substrate 2 and an antireflection layer 3 stacked on the substrate 2. The antireflection layer 3 comprises, sequentially from the substrate 2 side, a first refractive index layer 31 having a refractive index of from 1.6 to 1.9, a second refractive index layer 32 having a refractive index of from 2.2 to 2.5, a third refractive index layer 33 having a refractive index of from 2.0 to 2.3, and a fourth refractive index layer 34 having a refractive index of from 1.2 to 1.5. Further, it is preferred that the refractive index of the second refractive index layer is larger than the refractive index of the third refractive index layer. Here, the refractive index is a refractive index with light having a wavelength of 550 nm.

In the antireflection stack 1 of the present invention, the thicknesses of the first to fourth refractive index layers 31 to 34 are preferably made to be relatively close to one another. Among the first to fourth refractive index layers 31 to 34, the ratio of the thickness of the layer having the maximum thickness to the thickness of the layer having the minimum thickness is preferably more than 1 and at most 5, more preferably more than 1 and at most 3. By making the thicknesses to be relatively close to one another, it is possible to reduce the sensitivity of a change in the reflected color to a change in the incident angle. It is thereby possible to make the reflected color to be a moderate chromatic color and at the same time, to reduce a change in the reflected color to a change in the incident angle and thereby to effectively prevent multicolorization. Further, it is possible to reduce the reflectance, while making the reflected color to be a moderate chromatic color and reducing a change in the reflected color to a change in the incident angle. Still further, even if the thicknesses of the first to fourth refractive index layers 31 to 34 fluctuate to some extent from the desired thicknesses due to slight differences in the production conditions, it is possible to maintain the reflected color to be a moderate chromatic color and at the same time, to reduce a change in the reflected color to a change in the incident angle and thereby to effectively prevent multicolorization.

The substrate 2 is not particularly limited so long as it has transparency, and it may, for example, be a rigid plate substrate or a flexible polymer film.

The material for the plate substrate may, for example, be common glass composed mainly of silicon dioxide, inorganic glass made of inorganic material of various compositions, or an organic material such a transparent acrylic resin or polycarbonate resin.

The polymer film may, for example, be a polyester film of e.g. polyethylene terephthalate, a polyolefin film of e.g. polypropylene, a polyvinyl chloride film, an acrylic resin film, a polyethersulfone film, a polyarylate film or a polycarbonate film.

The thickness of the substrate 2 may be suitably selected depending on the particular application. For example, in the case of one made of a plate substrate, it is preferably from 0.1 to 5 mm, more preferably from 0.2 to 2 mm, and in the case of one made of a polymer film, it is preferably from 50 to 200 µm, more preferably from 75 to 150 µm. Further, the substrate 2 is not necessarily limited to have a single layer structure composed of a single layer, but may have a multi-layer structure composed of a plurality of layers.

The antireflection layer 3 is one having a four-layer structure and comprises, sequentially from the substrate 2 side, a first refractive index layer 31 having a refractive index of from 1.6 to 1.9, a second refractive index layer 32 having a refractive index of from 2.2 to 2.5, a third refractive index layer 33 having a refractive index of from 2.0 to 2.3, and a fourth refractive index layer 34 having a refractive index of from 1.2 to 1.5.

The first refractive index layer 31 is one having a refractive index of from 1.6 to 1.9. If the refractive index is less than 1.6 or more than 1.9, the reflected color tends not to become a moderate chromic color, and the change in the reflected color tends to be sensitive to a change of the incident angle, whereby multicolorization tends to be likely. Further, if the refractive index is less than 1.6 or more than 1.9, it may not be possible to sufficiently reduce the reflectance. The refractive index of the first refractive index layer 31 is preferably from 1.65 to 1.87, more preferably from 1.70 to 1.85.

The material constituting the first refractive index layer 31 is not particularly limited so long as the refractive index would be within a range of from 1.6 to 1.9, and it may, for example, be a metal oxide such as silicon oxide, indium oxide, tin oxide, niobium oxide, titanium oxide, zirconium oxide, cerium oxide, tantalum oxide, aluminum oxide or zinc oxide. The first refractive index layer 31 may be one composed solely of one member selected from these metal oxides, but may preferably be one composed of two or more of them, since it is thereby easy to adjust the refractive index to be within a range of from 1.6 to 1.9 as a refractive index of a medium-level. In the case of one composed of two or more of them, it may further contain a composite oxide of such two or more metals. The first refractive index layer 31 may suitably be formed by a dry coating method, such as a chemical vapor deposition (CVD) method or a physical vapor deposition (PVD) method, particularly a vacuum vapor deposition method or a sputtering method as one of physical vapor deposition methods.

The thickness of the first refractive index layer 31 is preferably from 40 to 100 nm. By adjusting the thickness of the first refractive index layer 31 to be at least 40 nm, it becomes easy to make the reflected color to be a moderate chromatic color, and at the same time, it is possible to reduce a change in the reflected color to a change in the incident angle and thereby to effectively prevent multicolorization. Further, by adjusting the thickness of the first refractive index layer 31 to be at least 40 nm, it is also possible to effectively reduce the reflectance. The thickness of the first refractive index layer 31 is sufficient when it is 100 nm, and by adjusting the thickness to be at most this value, the productivity can also be made good.

The first refractive index layer 31 has a larger influence over the multicolorization as compared with the second to fourth refractive index layers 32 to 34. For example, if the first refractive index layer 31 becomes thin, the change in the reflected color tends to be sensitive to a change of the incident angle. Therefore, it is particularly preferred to make the thickness of the first refractive index layer 31 to be at least 40 nm. The thickness of the first refractive index layer 31 is more preferably from 50 to 90 nm, further preferably from 60 to 80 nm.

The second refractive index layer 32 is one having a refractive index of from 2.2 to 2.5. If the refractive index is less than 2.2 or more than 2.5, the reflected color tends not to become a moderate chromic color, and the change in the reflected color tends to be sensitive to a change of the incident angle, whereby multicolorization tends to be likely. Further, if the refractive index is less than 2.2 or more than 2.5, it may not be possible to sufficiently reduce the reflectance. The refractive index of the second refractive index layer 32 is preferably from 2.23 to 2.47, more preferably from 2.25 to 2.45.

The material constituting the second refractive index layer 32 is not particularly limited so long as the refractive index would be within a range of from 2.2 to 2.5, and as a material whereby it is possible to obtain a relatively high refractive index, a metal oxide such as niobium oxide or titanium oxide may, for example, be mentioned. The second refractive index layer 32 may be one composed solely of one member selected from these metal oxides, or may be one composed of two or more selected from the group having silicon oxide added to these metal oxides. In the case of one composed of two or more of them, it may further contain a composite oxide of such two or more metals. The second refractive index layer 32 may suitably be formed by a dry coating method, such as a chemical vapor deposition (CVD) method or a physical vapor deposition (PVD) method, particularly a vacuum vapor deposition method or a sputtering method as one of physical vapor deposition methods.

The thickness of the second refractive index layer 32 is preferably from 30 to 80 nm. By adjusting the thickness of the second refractive index layer 32 to be at least 30 nm, it becomes easy to make the reflected color to be a moderate chromatic color, and at the same time, it is possible to reduce a change in the reflected color to a change in the incident angle and thereby to effectively prevent multicolorization. Further, by adjusting the thickness of the second refractive index layer 32 to be at least 30 nm, it is also possible to effectively reduce the reflectance. The thickness of the second refractive index layer 32 is sufficient when it is 80 nm, and by adjusting the thickness to be at most this value, the productivity can also be made good. The thickness of the second refractive index layer 32 is more preferably from 35 to 70 nm, further preferably from 40 to 60 nm.

The third refractive index layer 33 is one having a refractive index of from 2.0 to 2.3. If the refractive index is less than 2.0 or more than 2.3, the reflected color tends not to become a moderate chromic color, and the change in the reflected color tends to be sensitive to a change of the incident angle, whereby multicolorization tends to be likely. Further, if the refractive index is less than 2.0 or more than 2.3, it may not be possible to sufficiently reduce the reflectance. Further, the refractive index of the third refractive index layer 33 is required to be made to be smaller than the refractive index of the second refractive index layer 32. If the refractive index of the third refractive index layer 33 is larger than the refractive index of the second refractive index layer 32, the reflectance may not be sufficiently reduced. The refractive index of the third refractive index layer 33 is preferably from 2.05 to 2.28, more preferably from 2.10 to 2.25.

The material constituting the third refractive index layer 33 is not particularly limited so long as the refractive index would be within a range of from 2.0 to 2.3, and it may, for example, be a metal oxide such as silicon oxide, indium oxide, tin oxide, niobium oxide, titanium oxide, zirconium oxide, cerium oxide, tantalum oxide, aluminum oxide or zinc oxide. The third refractive index layer 33 may be one composed solely of one member selected from these metal oxides, but may preferably be one composed of two or more of them, since it is thereby easy to adjust the refractive index to be within a range of from 2.0 to 2.3 as a refractive index of a medium-level. In the case of one composed of two or more of them, it may further contain a composite oxide of such two or more metals. The third refractive index layer 33 may suitably be formed by a dry coating method, such as a chemical vapor deposition (CVD) method or a physical vapor deposition (PVD) method, particularly a vacuum vapor deposition method or a sputtering method as one of physical vapor deposition methods.

The thickness of the third refractive index layer 33 is preferably from 30 to 90 nm. By adjusting the thickness of the third refractive index layer 33 to be at least 30 nm, it becomes easy to make the reflected color to be a moderate chromatic color, and at the same time, it is possible to reduce a change in the reflected color to a change in the incident angle and thereby to effectively prevent multicolorization. Further, by adjusting the thickness of the third refractive index layer 33 to be at least 30 nm, it is also possible to effectively reduce the reflectance. The thickness of the third refractive index layer 33 is sufficient when it is 90 nm, and by adjusting the thickness to be at most this value, the productivity can also be made good. The thickness of the third refractive index layer 33 is more preferably from 40 to 80 nm, further preferably from 50 to 75 nm.

The fourth refractive index layer 34 is one having a refractive index of from 1.2 to 1.5. If the refractive index is less than 1.2 or more than 1.5, the reflected color tends not to become a moderate chromic color, and the change in the reflected color tends to be sensitive to a change of the incident angle, whereby multicolorization tends to be likely. Further, if the refractive index is less than 1.2 or more than 1.5, it may not be possible to sufficiently reduce the reflectance. The refractive index of the fourth refractive index layer 34 is preferably from 1.23 to 1.45, more preferably from 1.25 to 1.40.

The thickness of the fourth refractive index layer 34 is preferably from 60 to 120 nm. By adjusting the thickness of the fourth refractive index layer 34 to be at least 60 nm, it becomes easy to make the reflected color to be a moderate chromatic color, and at the same time, it is possible to reduce a change in the reflected color to a change in the incident angle and thereby to effectively prevent multicolorization. Further, by adjusting the thickness of the fourth refractive index layer 34 to be at least 60 nm, it is also possible to effectively reduce the reflectance. The thickness of the fourth refractive index layer 34 is sufficient when it is 120 nm, and by adjusting the thickness to be at most this value, the productivity can also be made good. The thickness of the fourth refractive index layer 34 is more preferably from 70 to 110 nm, further preferably from 80 to 100 nm.

The fourth refractive index layer 34 is not particularly limited, so long as it is one whereby the refractive index would be within a range of from 1.2 to 1.5, and it may be one formed by a dry coating method, such as a chemical vapor deposition (CVD) method or a physical vapor deposition (PVD) method by using, as a constituting material, a low refractive index material such as silicon oxide or magnesium fluoride. Further, it is preferably one formed by a wet system method, since it is thereby easy to bring the refractive index to be within a low refractive index range of from 1.2 to 1.5 and to impart other properties such as antifouling properties, water resistance, chemical resistance, etc.

One formed by a wet coating method may be one containing low refractive index fine particles, specifically one having low refractive index fine particles incorporated in a matrix component which becomes to be a binder. Such low refractive index fine particles may preferably be those having a refractive index of e.g. from 1.10 to 1.40. By using such low refractive index fine particles, it is possible to effectively reduce the refractive index of the fourth refractive index layer 34 and to readily bring it within the predetermined range. The refractive index of such low refractive index fine particles is more preferably from 1.15 to 1.35, further preferably from 1.20 to 1.30.

The material constituting such low refractive index fine particles is preferably silicon oxide or magnesium fluoride having a small refractive index, and from the viewpoint of the refractive index, dispersion stability and costs, silicon oxide is particularly preferred. As low refractive index fine particles containing silicon oxide as the constituting material, silica particles prepared by reacting a silicon alkoxide in the presence of a basic catalyst such as ammonia by a sol-gel method, colloidal silica prepared by using e.g. sodium silicate as the starting material, or fumed silica prepared in a gas phase, may, for example, be exemplified.

Such low refractive index fine particles are particularly preferably hollow silica particles having a hollow structure such that a void space is formed inside of an outer shell. The hollow silica particles have a small refractive index because of void spaces formed inside thereof, whereby the refractive index of the fourth refractive layer 34 can be effectively reduced. In the hollow silica particles, some of void spaces may be in such a state they are exposed to exterior of the outer shells, i.e. the internal void spaces may be in such a state that they are communicated with outside of the hollow silica particles. The shape of the hollow silica particles is not particularly limited, and it may, for example, be spherical, egg-shaped, spindle-shaped or amorphous shape.

As such hollow silica particles, it is possible to use ones produced by a known production process. For example, it is possible to use ones obtained by a process which comprises a first step of forming core particles which can be removed by a post treatment, a second step of forming a shell layer to cover the core particles, and a third step of dissolving the core particles.

The average particle size of the low refractive index fine particles is preferably from 20 to 100 nm, more preferably from 30 to 90 nm, particularly preferably from 40 to 80 nm. By adjusting the average particle size of the low refractive index fine particles to be at least 20 nm, it is possible to increase spaces among particles thereby to effectively reduce the refractive index of the fourth refractive index layer 34. Particularly in a case where the low refractive index fine particles are hollow silica particles, it is possible to increase the proportion of void spaces inside of the particles thereby to effectively reduce the refractive index of the fourth refractive index layer 34. Further, by adjusting the average particle size of the low refractive index fine particles to be at most 100 nm, it is possible to prevent formation of excessive irregularities at the surface of the fourth refractive index layer 34, thereby to improve the external appearance, etc. and to secure also the durability of the particles themselves.

The average particle size of the low refractive index fine particles can be defined by the following formula, as a number average value d in number (n=100), by actually measuring diameters of primary particles (individual primary particles in a case where particles are aggregated to form chained secondary particles) in a planar visual field by means of a transmission electron microscope with 10,000 to 50,000 magnification.

$$d = \frac{\sum_{i=1}^{n} d_i}{n}$$

In a case where the low refractive index fine particles are hollow silica particles, their porosity is preferably from 10 to 80%, more preferably from 20 to 60%. By adjusting the porosity to be at least 10%, it is possible to effectively reduce the refractive index of the particles themselves by the inside void spaces thereby to reduce the refractive index of the fourth refractive index layer 34. On the other hand, by adjusting the porosity to be at most 80%, it is possible to secure the durability of the particles.

The matrix component is preferably an inorganic compound, more preferably a metal oxide. The metal oxide may, for example, be silicon oxide, aluminum oxide, titanium oxide, zirconium oxide or tantalum oxide as a preferred one. Such a matrix component is one made of a hydrolysable metal compound as the starting material.

As the hydrolysable metal compound, a metal alkoxide of e.g. silicon, aluminum, titanium, zirconium or tantalum is, for example, preferred from the viewpoint of the strength, chemical stability, etc. of the layer. Among such metal alkoxides, a silicon tetraalkoxide, an aluminum trialkoxide, a titanium tetraalkoxide or a zirconium tetraalkoxide is, for example, preferably used. As the alkoxy group contained in the above alkoxide, particularly preferred is, for example, a methoxy group, an ethoxy group, a propoxy group or a butoxy group.

The refractive index of the matrix component is influential over the reflectance, and therefore, the starting material for the matrix component is preferably a silicon alkoxide, particularly a silicon tetraalkoxide or its oligomer, whereby it is possible to obtain one having a small refractive index. As the starting material for the matrix component, a plurality selected from these metal alkoxides may be used as mixed.

The starting material for the matrix component is not necessarily limited to the metal alkoxide, so long as a reaction product of $M(OH)_n$ is obtainable by hydrolysis, and for example, a halide of a metal, or a metal compound having an isocyanate group, an acyloxy group or an aminoxy group, may be exemplified. Further, it is possible to use also, for example, a compound represented by $R^1{}_n M(OR^2)_{4-n}$ (M is a silicon atom, $R^1$ is an organic functional group such as an alkyl group, an amino group, an epoxy group, a phenyl group or a methacryloxy group, $R^2$ is e.g. an alkyl group, and n is an integer of from 1 to 3) as one type of silicon alkoxides.

In the fourth refractive index layer 34, the content of the low refractive index fine particles is preferably from 40 to 95 mass %, more preferably from 50 to 90 mass %, particularly preferably from 60 to 85 mass %, in the total amount of the matrix component and the low refractive index fine particles. By adjusting the content of the low refractive index fine particles to be at least 40 mass %, it is possible to increase spaces inside of the particles or among the particles in the fourth refractive index layer 34 thereby to effectively reduce the refractive index of the fourth refractive index layer 34. On the other hand, by adjusting it to be at most 95 mass %, it is possible to prevent a decrease of e.g. the adhesive force among the particles due to a decrease of the matrix component thereby to secure the mechanical strength of the fourth refractive index layer 34.

To the fourth refractive index layer 34, other components may be incorporated as the case requires, within a range not to be contrary to the object of the present invention. As such other components, antifouling agents may, for example, be mentioned, and specifically, a fluorinated alkoxysilane, a dimethyl silicone, etc. may, for example, be mentioned.

The fluorinated alkoxysilane may, for example, be fluorotriethoxysilane, trifluoropropyltrimethoxysilane, tridecafluorooctyltrimethoxysilane or heptadecafluorodecyltrimethoxysilane.

One of such antifouling agents may be used alone, or two or more of them may be used in combination. The antifouling agent is preferably adjusted to be e.g. from 0.01 to 10 mass % in the entire material constituting the fourth refractive index layer 34.

Further, components other than the antifouling agent, such as an ultraviolet absorber, pigment, etc., may also be incorporated as the case requires, within a range not to contrary to the object of the present invention. Such components are preferably at most 5 mass % in the entire material constituting the fourth refractive index layer 34.

The fourth refractive index layer 34 may be formed, for example, as follows. Firstly, low refractive index fine particles, a metal compound hydrolysable to form a matrix component, a catalyst for hydrolysis, water and a solvent are mixed, and the hydrolysable metal compound is hydrolyzed to prepare a coating fluid. The hydrolysis can be carried out, for example, by stirring at room temperature for from 1 to 24 hours for a reaction, or by stirring at a temperature higher than room temperature, for example, from 40 to 80° C. for from 10 to 50 minutes for a reaction. Here, the hydrolysable metal compound may be hydrolyzed in a state as mixed with the low refractive index fine particles as mentioned above, or may preliminarily be hydrolyzed and then mixed with the low refractive index fine particles. Further, the coating fluid may be diluted with a suitable solvent depending upon the coating method, etc.

The catalyst for the hydrolysis is most effectively an acid catalyst, and for example, a mineral acid such as hydrochloric acid or nitric acid, or acetic acid, may, for example, be mentioned. The acid catalyst is preferred, since the condensation polymerization reaction rate is thereby lower than the hydrolytic reaction rate of the hydrolysable metal compound such as a metal alkoxide, whereby it is possible to form $M(OH)_n$ as a hydrolyzed product in a large amount. With a basic catalyst, the condensation polymerization reaction rate tends to be higher than the hydrolytic reaction rate, whereby the metal alkoxide tends to be a fine particulate reaction product and will be used for the particle size growth of the low refractive index fine particles initially present, whereby the function to form the matrix component tends to be less.

The content of the catalyst is preferably from 0.001 to 4 in molar ratio to the metal compound.

The amount of water to be added, which is required for the hydrolysis of the metal compound, is preferably from 0.1 to 100 in molar ratio to the metal compound. If the amount of water to be added, is smaller than 0.1 in molar ratio, acceleration of the hydrolysis of the metal compound tends to be inadequate, and if it exceeds 100 in molar ratio, the stability of the coating fluid tends to be low.

The solvent is not particularly limited so long as it is capable of substantially dissolving the metal compound, but an alcohol such as methanol, ethanol, propanol or butanol, a cellosolve such as ethyl cellosolve, butyl cellosolve or propyl cellosolve, or a glycol such as ethylene glycol, propylene glycol or hexylene glycol, is most preferred.

In the coating fluid, the proportion of the content of the low refractive index fine particles to the total amount of the low refractive index fine particles and the metal compound, is preferably from 40 to 95 mass %, more preferably from 50 to 90 mass %, particularly preferably from 60 to 85 mass %. Here, the content of the metal compound is a content as calculated as a metal oxide such as silicon oxide ($SiO_2$), aluminum oxide ($Al_2O_3$), titanium oxide ($TiO_2$), zirconium oxide ($ZrO_2$) or tantalum oxide ($Ta_2O_5$).

The coating fluid is applied, dried and heated on the third refractive index layer 33 to carry out a dehydration condensation reaction of the hydrolyzed product of the metal compound and vaporization/combustion of volatile components thereby to form the fourth refractive index layer 34. The application of the coating fluid may be carried out, for example, by a dip coating method, an air-knife coating method, a curtain coating method, a roller coating method, a wire-bar coating method, a gravure coating method or a die coating method.

A method for forming the fourth refractive index layer 34 may, for example, be, as one by means of a dry coating method, a method of heating magnesium fluoride in a vacuum chamber to form a film by a physical vapor deposition method.

In a case where the fourth refractive index layer 34 is a layer containing magnesium fluoride, an antifouling layer (not shown) may be formed, as the case requires, on the fourth refractive index layer 34, i.e. on the side opposite to the substrate 2, of the fourth refractive index layer 34, in a thickness at a level not to be contrary to the object of the present invention. The thickness of the antifouling layer is preferably from 3 to 20 nm, more preferably from 5 to 15 nm. When the thickness of the antifouling layer is at least 3 nm, a sufficient antifouling performance is obtainable. Further, when it is at most 20 nm, the antireflection performance of the antireflection stack of the present invention will not be impaired, such being desirable.

The material to be used for the antifouling layer, may be a fluorinated organic silicon compound. Further, in order to improve the adhesion between the antifouling layer and the fourth refractive index layer, an adhesion layer containing a metal oxide such as silicon oxide may be formed between the fourth refractive index layer and the antifouling layer, as the case requires, in a thickness at a level not to be contrary to the object of the present invention. The thickness of such an adhesion layer is preferably from 5 to 20 nm, more preferably from 5 to 10 nm. When the thickness of the adhesion layer is at least 5 nm, the adhesion between the fourth refractive index layer and the antifouling layer can be made to be sufficient, such being desirable. Further, when it is at most 20 nm, the antireflection performance of the antireflection stack of the present invention will not be impaired, such being desirable.

The antireflection stack 1 of the present invention is not necessarily limited to one having only the antireflection layer 3 provided on the substrate 2. For example, a hard coating layer may be provided to the antireflection stack 1 of the present invention in order to impart a physical strength to e.g. a polymer film to constitute the substrate 2. Such a hard coating layer may be one to be formed by a polymerization reaction or by a cross-linking reaction of an ionizing radiation curable compound. Further, for antistatic purpose, an electrically conductive layer may be provided to the antireflection stack 1 of the present invention. Such an electrically conductive layer may, for example, be one formed by a conventional method such as a method of applying a conductive coating fluid containing conductive fine particles and a reactive curable resin, a method of applying a transparent conductive material made of a transparent polymer having electrical conductivity, or a method of forming the layer by vapor depositing or sputtering e.g. a metal, metal oxide or the like.

The antireflection stack 1 of the present invention preferably has a luminous reflectance (stimulus value Y of reflection as defined in JIS Z8701) of at most 0.2%. According to the antireflection stack 1 of the present invention, the antireflection layer 3 is made to have a four-layer structure comprising the first to fourth refractive index layers 31 to 34, and the refractive indices of the respective refractive index layers are adjusted to be within the predetermined ranges, whereby it is possible to bring the luminous reflectance to be at most 0.2%, while making the reflected color to be a moderate chromatic color and preventing multicolorization. With the antireflection stack 1 of the present invention, particularly by adjusting the thicknesses of the respective refractive index layers to be within the predetermined ranges in addition to adjusting the refractive indices of the respective refractive index layers to be within the predetermined ranges, it is possible to effectively bring the luminous reflectance to be at most 0.2%.

Further, with the antireflection stack 1 of the present invention, the chromaticity values (chromaticity coordinates x and y as defined in JIS Z8701) of the reflected color at an incident angle of 5° are preferably $0.15 \leq x \leq 0.30$ and $0.15 \leq y \leq 0.30$, more preferably $0.20 \leq x \leq 0.28$ and $0.20 \leq y \leq 0.30$. Further, with the antireflection stack 1 of the present invention, the chromaticity values of the reflected color at an incident angle of 60° are preferably $0.25 \leq x \leq 0.335$ and $0.25 \leq y \leq 0.335$, more preferably $0.28 \leq x \leq 0.330$ and $0.28 \leq y \leq 0.330$. By making it to have such chromaticity values, it is possible to obtain a reflected color of slightly bluish to white without having excessively bluish or reddish tint, and it is possible to improve the appearance of e.g. an image display device having the antireflection stack 1 mounted.

Also with respect to the reflected color, by making the antireflection layer 3 to have a four-layer structure comprising the first to fourth refractive index layers 31 to 34 and adjusting the refractive indices of the respective refractive index layers to be within the predetermined ranges, it is possible to bring the chromaticity values to be within the predetermined ranges. Particularly by adjusting the thicknesses of the respective refractive index layers to be within the predetermined ranges in addition to adjusting the refractive indices of the respective refractive index layers to be within the predetermined ranges, it is possible to effectively bring the chromaticity values of the reflected color to be within the predetermined ranges.

Further, with the antireflection stack 1 of the present invention, the water contact angle at the surface of the fourth refractive index layer 34 is preferably at least 90°, more preferably at least 100°. Here, the water contact angle is one to be obtained by a three point method by dropping 1 μL of pure water on the surface of the fourth refractive index layer 34. By so adjusting the water contact angle, the antifouling property, water resistance, chemical resistance, etc. of the antireflection stack 1 can be made good. Adjustment of the water contact angle may be carried out, for example, by incorporating e.g. the above-mentioned antifouling agent such as a fluorinated alkoxysilane or dimethyl silicone to the fourth refractive index layer 34. In the antireflection stack 1 of the present invention, also from the viewpoint of improving e.g. the antifouling property by adding e.g. an antifouling agent to the fourth refractive index layer 34, it is preferred that the fourth refractive index layer 34 is made to be one obtained by a wet system method, particularly one having low refractive index fine particles such as hollow silica particles incorporated in the matrix component.

In a case where the fourth refractive index layer 34 is one obtained by a dry coating method, e.g. in a case where the fourth refractive index layer 34 is a layer having magnesium fluoride, it is preferred to provide an antifouling layer on the fourth refractive index layer 34.

The antireflection stack 1 of the present invention may be applied to an image display device such as a liquid crystal display device (LCD), a plasma display panel (PDP), an electroluminescence display (ELD), a cathode-ray tube display device (CRT) or a surface-conduction electron-emitter display (SED).

The antireflection stack 1 of the present invention is used, for example, so that the substrate 2 side is bonded to an image display surface of an image display device. By applying the antireflection stack 1 of the present invention to e.g. an image display device, the appearance of the image display device can be made good.

EXAMPLES

Now, the antireflection stack of the present invention will be described in further detail with reference with Examples, but it should be understood that the present invention is by no means limited to the following Examples.

Example 1

A glass substrate (AS glass (soda lime glass), thickness: 2 mm) was introduced into a vacuum chamber, which was evacuated until the pressure became $1 \times 10^{-4}$ Pa, whereupon first to third refractive index layers were sequentially formed by a magnetron sputtering method. Here, the following refractive indices of the respective refractive index layers are ones obtained from the spectral transmittances and spectral reflectances on the assumption that the wavelength dispersion is Cauchy type, and are values at a wavelength of 550 nm. Specifically, the refractive index of a layer was assumed to have a form of $n=A_0+A_1/\lambda^2+A_2/\lambda^4$ ($\lambda$ is a wavelength of light), and $A_0$ to $A_2$ were obtained so that mean square error of the measured value and calculated value of the spectral transmittance and spectral reflectance at a wavelength of from 380 nm to 780 nm became minimum. Each of $A_0$, $A_1$ and $A_2$ is a fitting parameter.

Firstly, on the glass substrate, a first refractive index layer made of oxides of silicon and tin and having a thickness of 67 nm was formed by carrying out pulse sputtering with a reverse pulse width of 5 μsec at a power density of 3.8 W/cm² at a frequency of 20 kHz under a pressure of 0.5 Pa, by using a tin target having 40 atomic % of silicon added, while introducing a mixed gas having 40 vol % of oxygen gas mixed to argon gas. The refractive index of the first refractive index layer was 1.77.

A second refractive index layer made of niobium oxide and having a thickness of 48 nm was formed by carrying out pulse sputtering with a reverse pulse width of 5 μsec at a power density of 3.8 W/cm² at a frequency of 20 kHz under a pressure of 0.1 Pa, by using a niobium oxide target (tradename: NBO, manufactured by AGC Ceramics Co., Ltd.), while introducing a mixed gas having 10 vol % of oxygen gas mixed to argon gas. The refractive index of the second refractive index layer was 2.38.

A third refractive index layer made of oxides of indium and cerium and having a thickness of 62 nm was formed by carrying out pulse sputtering with a reverse pulse width of 5 μsec at a power density of 3.8 W/cm² at a frequency of 20 kHz under a pressure of 0.1 Pa, by using a target prepared by adding 20 mass % of indium oxide to cerium oxide, while introducing a mixed gas having 10 vol % of oxygen gas mixed to argon gas. The refractive index of the third refractive index layer was 2.20.

Then, on this third refractive index layer, a fourth refractive index layer was formed by a spin coating method, to obtain an antireflection stack. Firstly, a liquid having isopropyl alcohol (IPA) and polyethylene glycol monomethyl ether (PGM) mixed in a mass ratio of 4:1, and a coating fluid to form a fourth refractive index layer (tradename: ELCOM AG-1027SIC, manufactured by JGC C&C) containing hollow silica particles and a hydrolyzed product of a silicon alkoxide, were mixed at a mass ratio of 1:1.2 to obtain a diluted fluid.

On the third refractive index layer, 1 cc of the above diluted fluid was gently dropped, followed by rotation by a spin coater under conditions of a rotational speed of 500 rpm for 30 seconds, at 1,000 rpm for 30 seconds and at 5,000 rpm for 0.5 second, to form a coating film. Then, firing was carried out in a high temperature chamber at 150° C. for 30 minutes to form a fourth refractive index layer containing hollow silica particles and having a thickness of 90 nm. The refractive index of the fourth refractive index layer was 1.33.

Example 2

A glass substrate (AS glass (soda lime glass), thickness: 2 mm) was introduced into a vacuum chamber, which was evacuated until the pressure became $1 \times 10^{-4}$ Pa, whereupon first to third refractive index layers were sequentially formed by a magnetron sputtering method.

Firstly, on the glass substrate, co-sputtering was carried out under a pressure of 0.1 Pa, by using a niobium oxide target (tradename: NBO, manufactured by AGC Ceramics Co., Ltd.) and a silicon target, while introducing a mixed gas having 30 vol % of oxygen gas mixed to argon gas. With the niobium oxide target, pulse sputtering was carried out with a reverse pulse width of 5 μsec at a power density of 4.6 W/cm$^2$ at a frequency of 20 kHz, and with the silicon target, pulse sputtering was carried out with a reverse pulse width of 5 μsec at a power density of 3.8 W/cm$^2$ at a frequency of 20 kHz, to form a first refractive index layer made of oxides of niobium and silicon and having a thickness of 72 nm. The refractive index of the first refractive index layer was 1.77.

A second refractive index layer made of niobium oxide and having a thickness of 55 nm was formed by carrying out pulse sputtering with a reverse pulse width of 5 μsec at a power density of 3.8 W/cm$^2$ at a frequency of 20 kHz under a pressure of 0.1 Pa, by using a niobium target, while introducing a mixed gas having 40 vol % of oxygen gas mixed to argon gas. The refractive index of the second refractive index layer was 2.33.

By using a niobium oxide target (tradename: NBO, manufactured by AGC Ceramics Co., Ltd.) and a silicon target, co-sputtering was carried out under a pressure of 0.1 Pa, while introducing a mixed gas having 30 vol % of oxygen gas mixed to argon gas. With the niobium oxide target, pulse sputtering was carried out with a reverse pulse width of 5 μsec at a power density of 6.3 W/cm$^2$ at a frequency of 20 kHz, and with the silicon target, pulse sputtering was carried out with a reverse pulse width of 5 μsec at a power density of 1.5 W/cm$^2$ at a frequency of 20 kHz, to form a third refractive index layer made of oxides of niobium and silicon and having a thickness of 60 nm. The refractive index of the third refractive index layer was 2.15.

Then, on this third refractive index layer, in the same manner as in Example 1, a fourth refractive index layer containing hollow silica particles and having a thickness of 90 nm and a refractive index of 1.33, was formed to obtain an antireflection stack.

Example 3

A glass substrate (AS glass (soda lime glass), thickness: 2 mm) was introduced into a vacuum chamber, which was evacuated until the pressure became $1 \times 10^{-4}$ Pa, whereupon first to third refractive index layers were sequentially formed by a magnetron sputtering method.

Firstly, on the glass substrate, a first refractive index layer made of oxides of silicon and indium and having a thickness of 70 nm was formed by carrying out pulse sputtering with a reverse pulse width of 5 μsec at a power density of 3.8 W/cm$^2$ at a frequency of 20 kHz under a pressure of 0.1 Pa, by using a target prepared by adding 30 mass % of silicon oxide to indium oxide, while introducing a mixed gas having 10 vol % of oxygen gas mixed to argon gas. The refractive index of the first refractive index layer was 1.79.

A second refractive index layer made of niobium oxide and having a thickness of 55 nm was formed by carrying out pulse sputtering with a reverse pulse width of 5 μsec at a power density of 3.8 W/cm$^2$ at a frequency of 20 kHz under a pressure of 0.1 Pa, by using a niobium target, while introducing a mixed gas having 40 vol % of oxygen gas mixed to argon gas. The refractive index of the second refractive index layer was 2.33.

A third refractive index layer made of oxides of indium and cerium and having a thickness of 64 nm was formed by carrying out pulse sputtering with a reverse pulse width of 5 μsec at a power density of 3.8 W/cm$^2$ at a frequency of 20 kHz under a pressure of 0.5 Pa, by using a target prepared by adding 20 mass % of indium oxide to cerium oxide, while introducing a mixed gas having 10 vol % of oxygen gas mixed to argon gas. The refractive index of the third refractive index layer was 2.15.

Then, on this third refractive index layer, in the same manner as in Example 1, a fourth refractive index layer containing hollow silica particles and having a thickness of 90 nm and a refractive index of 1.33, was formed to obtain an antireflection stack.

Example 4

An antireflection stack was prepared in the same manner as in Example 3 except that as the fourth refractive index layer, a layer of magnesium fluoride was formed by the following method.

In the vacuum chamber wherein the glass substrate having the first to third refractive index layers formed thereon, a hearth filled with magnesium fluoride granules (manufactured by Merck) was prepared. Inside of the vacuum chamber was evacuated to a pressure of $1 \times 10^{-4}$ Pa and then, the glass substrate was heated to 300° C., and a fourth refractive index layer having a refractive index of 1.38, made of magnesium fluoride and having a thickness of 85 nm, was formed by an electron beam deposition method (physical vapor deposition method) to obtain an antireflection stack.

Example 5

An antireflection stack was prepared in the same manner as in Example 4 except that the thickness of the fourth refractive index layer was made to be 75 nm, and an antifouling layer was formed on the fourth refractive index layer by the following method.

75 g of OPTOOL DSX (registered trade mark, manufactured by Daikin Industries, Ltd.) being a solution containing a fluorinated organic silicon compound, was introduced into a crucible used as a heating container. Inside of the crucible was evacuated by a vacuum pump for at least 10 hours to remove the solvent from the solution.

Then, after the removal of the solvent, the crucible was heated to 270° C. After reaching 270° C., the crucible was left to stand for 10 minutes until the temperature was stabilized. Then, the fluorinated organic silicon compound vaporized from the crucible was introduced into the vacuum chamber in which the glass substrate having the first to fourth refractive index layers formed thereon, was prepared, and an antifouling layer having a thickness of 10 nm was formed on the fourth refractive index layer by a vapor deposition method to obtain an antireflection stack.

Example 6

An antireflection stack was prepared in the same manner as in Example 5 except that an adhesion layer was formed between the fourth refractive index layer and the antifouling layer by the following method, and an antifouling layer having a thickness of 15 nm was formed on the adhesion layer.

On the fourth refractive index layer on the glass substrate having the first to fourth refractive index layers formed thereon, using a silicon target, pulse sputtering was carried out with a reverse pulse width of 5 μsec with a power density of 3.8 W/cm² at a frequency of 20 kHz under a pressure of 0.3 Pa, while introducing a mixed gas having 40 vol % of oxygen gas mixed to argon gas, to form an adhesion layer having a thickness of 10 nm.

Then, on the adhesion layer, an antifouling layer having a thickness of 15 nm was formed by the same method as in Example 5 to obtain an antireflection stack.

Comparative Example 1

A glass substrate (AS glass (soda lime glass), thickness: 2 mm) was introduced into a vacuum chamber, which was evacuated until the pressure became 1×10⁻⁴ Pa, whereupon first to fourth layers were sequentially formed by a magnetron sputtering method to obtain an antireflection stack.

Firstly, on the glass substrate, a first layer made of niobium oxide and having a thickness of 12 nm was formed by carrying out pulse sputtering with a reverse pulse width of 5 μsec at a power density of 3.8 W/cm² at a frequency of 20 kHz under a pressure of 0.1 Pa, by using a niobium oxide target (tradename: NBO, manufactured by AGC Ceramics Co., Ltd.), while introducing a mixed gas having 10 vol % of oxygen gas mixed to argon gas. The refractive index of the first layer was 2.38.

A second layer made of silicon oxide and having a thickness of 29 nm was formed by carrying out pulse sputtering with a reverse pulse width of 5 μsec at a power density of 3.8 W/cm² at a frequency of 20 kHz under a pressure of 0.1 Pa, by using a polycrystalline silicon target having boron added thereto, while introducing a mixed gas having 40 vol % of oxygen gas mixed to argon gas. The refractive index of the second layer was 1.47.

A third layer made of niobium oxide and having a thickness of 110 nm was formed by carrying out pulse sputtering with a reverse pulse width of 5 μsec at a power density of 3.8 W/cm² at a frequency of 20 kHz under a pressure of 0.1 Pa, by using a niobium oxide target (tradename: NBO, manufactured by AGC Ceramics Co., Ltd.), while introducing a mixed gas having 10 vol % of oxygen gas mixed to argon gas. The refractive index of the third layer was 2.38.

A fourth layer made of silicon oxide and having a thickness of 88 nm was formed by carrying out pulse sputtering with a reverse pulse width of 5 μsec at a power density of 3.8 W/cm² at a frequency of 20 kHz under a pressure of 0.1 Pa, by using a polycrystalline silicon target having boron added thereto, while introducing a mixed gas having 40 vol % of oxygen gas mixed to argon gas. The refractive index of the fourth layer was 1.47.

Comparative Example 2

A glass substrate (AS glass (soda lime glass), thickness: 2 mm) was introduced into a vacuum chamber, which was evacuated until the pressure became 1×10⁻⁴ Pa, whereupon first to third layers were sequentially formed by a magnetron sputtering method to obtain an antireflection stack. This Comparative Example is one having substantially the same construction as shown in Example 1 in JP-A-2006-289901.

Firstly, on the glass substrate, a first layer made of oxides of silicon and tin and having a thickness of 55 nm was formed by carrying out pulse sputtering with a reverse pulse width of 2.5 μsec at a power density of 3.9 W/cm² at a frequency of 100 kHz under a pressure of 0.55 Pa, by using a tin target having 40 atomic % of silicon added thereto, while introducing a mixed gas having 40 vol % of oxygen gas mixed to argon gas. The refractive index of the first layer was 1.81.

A second layer made of tin oxide and having a thickness of 96 nm was formed by carrying out pulse sputtering with a reverse pulse width of 2.5 μsec at a power density of 3.2 W/cm² at a frequency of 100 kHz under a pressure of 0.62 Pa, by using a tin target, while introducing a mixed gas having 55 vol % of oxygen gas mixed to argon gas. The refractive index of the second layer was 2.0.

A third layer made of silicon oxide and having a thickness of 100 nm was formed by carrying out pulse sputtering with a reverse pulse width of 2.5 μsec at a power density of 4.1 W/cm² at a frequency of 100 kHz under a pressure of 0.9 Pa, by using a polycrystalline silicon target having boron added thereto, while introducing a mixed gas having 30 vol % of oxygen gas mixed to argon gas. The refractive index of the third layer was 1.47.

Then, with respect to the antireflection stacks in Examples and Comparative Examples, the luminous reflectance, the incident angle dependency of the reflected color, and the water contact angle, were obtained by the following methods. The results are shown in Table 1.

(Luminous Reflectance)

The spectral reflectance was measured by a spectrophotometer (tradename: SolidSpec-3700, manufactured by Shimadzu Corporation), and by calculation, the luminous reflectance (stimulus value Y of reflection as defined in JIS Z8701) was obtained. Here, the backside (the glass substrate side) of the antireflection stack was colored black by a lacquer so that the measurement was carried out in such a state that there was no reflection on the back surface.

(Incident Angle Dependency of Reflected Color)

The spectral reflectance was measured by a spectrophotometer (tradename: SolidSpec-3700, manufactured by Shimadzu Corporation), and by calculation, the chromaticity values (chromaticity coordinates x and y as defined in JIS Z8701) were obtained. The angles for the incident angle were set to be 5°, 30° and 60°. Further, as the light source, standard light C was used. Here, the backside (the glass substrate side)

of the antireflection stack was colored black by a lacquer so that the measurement was carried out in such a state that there was no reflection on the back surface.

(Water Contact Angle)

Measured by means of "DM-051" (tradename) manufactured by Kyowa Interface Science Co., Ltd. In the measurement, 1 µL of pure water was dropped on the surface (the surface of the fourth refractive index layer or the surface of the antifouling layer) of the antireflection stack, and the contact angle was obtained by a three point method.

TABLE 1

|  | Luminous reflectance | Chromaticity (x, y) | | | Water contact angle |
| --- | --- | --- | --- | --- | --- |
|  |  | 5° | 30° | 60° |  |
| Ex. 1 | 0.13% | (0.212, 0.206) | (0.240, 0.247) | (0.311, 0.307) | 100° |
| Ex. 2 | 0.17% | (0.249, 0.251) | (0.264, 0.279) | (0.327, 0.325) | 102° |
| Ex. 3 | 0.17% | (0.225, 0.214) | (0.243, 0.235) | (0.309, 0.300) | 100° |
| Ex. 4 | 0.08% | (0.21, 0.15) | (0.27, 0.27) | (0.32, 0.32) | 30° |
| Ex. 5 | 0.10% | (0.22, 0.18) | (0.27, 0.27) | (0.32, 0.32) | 115° |
| Ex. 6 | 0.15% | (0.21, 0.14) | (0.27, 0.27) | (0.32, 0.32) | 115° |
| Comp. Ex. 1 | 0.35% | (0.246, 0.178) | (0.304, 0.362) | (0.303, 0.327) | 8° |
| Comp. Ex. 2 | 0.71% | (0.237, 0.211) | (0.252, 0.234) | (0.325, 0.322) | 7° |

As shown in Table 1, with the antireflection stacks in Comparative Examples, the reflectance cannot necessarily be sufficiently reduced, and the reflected color depends largely on the incident angle. On the other hand, with the antireflection stacks in Examples of the present invention, the reflectance can be sufficiently reduced, and the dependency of the reflected color on the incident angle can also be made small. Further, with the antireflection stacks in Examples 1 to 3, 5 and 6, it is evident that the water contact angle can be made large thereby to improve e.g. the antifouling property.

Then, with respect to antireflection stacks having the same constructions as the antireflection stacks in Examples 1 to 3 and Comparative Example 1 and the antireflection stack in Reference Example, the incident angle dependency of the reflected color and the thickness incident angle dependency of the reflected color were obtained by calculation. The results are shown in FIGS. 2 to 11. The above calculation was carried out by means of the calculation formula disclosed in "Optical thin films and film-forming techniques" (author: Lee Masanaka, Publisher: AGNE Gijutsu Center Inc.).

Here, the incident angle dependency of the reflected color shown in each of FIGS. 2, 4, 6, 8 and 10, is one showing the calculation results when the incident angle was changed by every 10° from 0° to 70° with respect to each antireflection stack. Further, the thickness·incident angle dependency of the reflected color in each of FIGS. 3, 5, 7, 9 and 11, is one showing the calculation results of the incident angle dependency of the reflected color (when the incident angle was changed by every 10° from 0° to 60°) when the thickness of each layer was changed alone by every 1% from +3% to −3% with respect to each antireflection stack. That is, in each of FIGS. 3, 5, 7, 9 and 11, the calculation results of "number of layers×number of changes in thickness (by every 1% from +3% to −3%)" types of antireflection stacks (with respect to each of them, the incident angle was changed by every 10° from 0° to 70°), are shown.

Here, the antireflection stack in Reference Example is one comprising a first layer (thickness: 12 nm, refractive index: 2.38), a second layer (thickness: 32 nm, refractive index: 1.47), a third layer (thickness: 110 nm, refractive index: 2.38) and a fourth layer (thickness: 93 nm, refractive index: 1.47).

As is evident from FIGS. 8 and 9, with respect to the antireflection stack having the same construction as in Comparative Example 1, the chromaticity values of the reflected color at an incident angle of 0° are small and show a strong bluish tint, and as the incident angle increases, the chromaticity values change substantially and finally show a reddish tint (FIG. 8). Further, with changes in thickness, substantial fluctuations are observed in the chromaticity values (FIG. 9).

Figure 2:
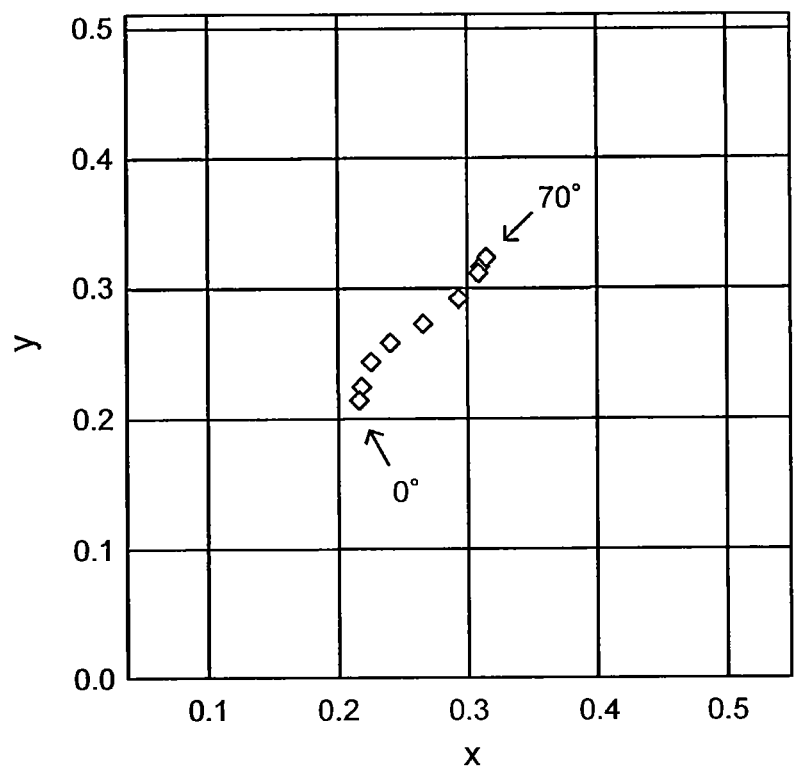
FIG. 2 is a graph showing the incident angle dependency of the reflected color of a product equivalent to Example 1.
Figure 3:
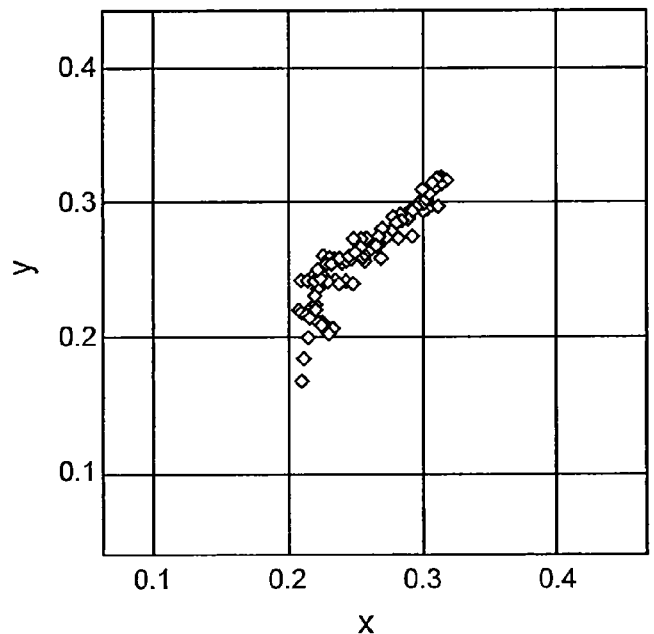
FIG. 3 is a graph showing the thickness-incident angle dependency of the reflected color of a product equivalent to Example 1.
Figure 4:
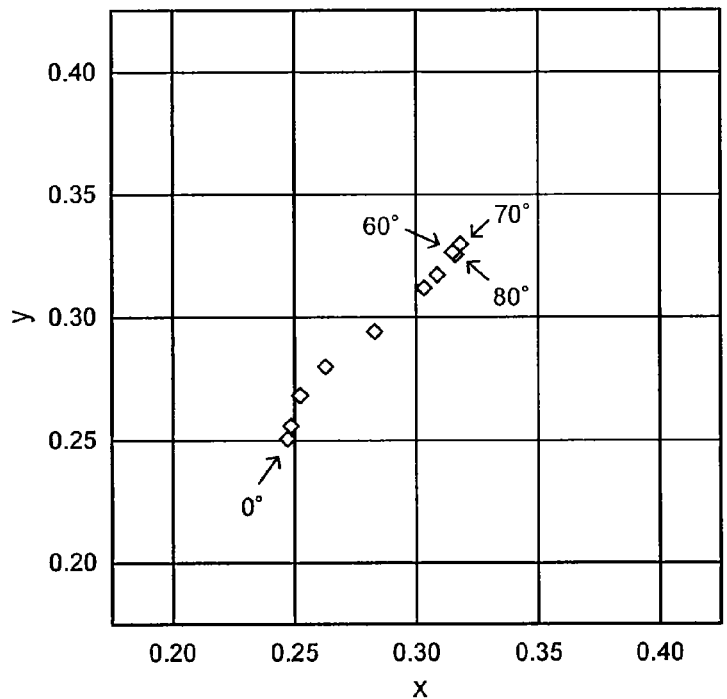
FIG. 4 is a graph showing the incident angle dependency of the reflected color of a product equivalent to Example 2.

On the other hand, as is evident from FIGS. 2 and 3, with respect to the antireflection stack having the same construction as in Example 1, the chromaticity values of the reflected color at an incident angle of 0° do not become excessively small and tend to show a slightly bluish tint, and as the incident angle increases, the chromaticity values increase, but can maintain the substantially white color (FIG. 2). Further, fluctuations in the chromaticity values at the time of changes in thickness can be suppressed (FIG. 3). Also with respect to the antireflection stacks having the same constructions as in Examples 2 and 3, the same tendencies are observed as is evident from FIGS. 4 to 7.

INDUSTRIAL APPLICABILITY

With the antireflection stack of the present invention, it is possible to reduce the reflected color and make it to have a moderate chromatic color, and at the same time, to suppress a multicolorization thereby to improve the visibility. Thus, it is useful for an image display device such as a liquid crystal display device (LCD), a plasma display panel (PDP), an electroluminescence display (ELD), a cathode-ray tube display device (CRT) or a surface-conduction electron-emitter display (SED).

This application is a continuation of PCT Application No. PCT/JP2012/061268, filed on Apr. 26, 2012, which is based upon and claims the benefit of priority from Japanese Patent Application No. 2011-102038 filed on Apr. 28, 2011. The contents of those applications are incorporated herein by reference in its entirety.

REFERENCE SYMBOLS

1: antireflection stack, 2: substrate, 3: antireflection layer, 31: first refractive index layer, 32: second refractive index layer, 33: third refractive index layer, 34: fourth refractive index layer.

What is claimed is:

1. An antireflection stack comprising a substrate and, stacked on the substrate, an antireflection layer of a four-layer structure which comprises, sequentially from the substrate side, a first refractive index layer, a second refractive index layer, a third refractive index layer and a fourth refractive index layer, wherein the first refractive index layer has a refractive index of from 1.7 to 1.79, the second refractive index layer has a refractive index of from 2.25 to 2.45, the third refractive index layer has a refractive index of from 2.1 to 2.3, the fourth refractive index layer has a refractive index of from 1.25 to 1.5, the refractive index of the second refractive index layer is larger than the refractive index of the third refractive index layer, the first refractive index layer has a thickness of from 60 to 100 nm, the second refractive index layer has a thickness of from 48 to 80 nm, the third refractive index layer has a thickness of from 30 to 64 nm, and the fourth refractive index layer has a thickness of from 75 to 120 nm, and the antireflection stack has chromaticity coordinates x and y as defined in JIS Z8701 of the reflected color at an incident angle 60° of 0.25<x<0.335 and 0.25<y<0.335.

2. The antireflection stack according to claim 1, wherein the fourth refractive index layer comprises a matrix component made of a metal oxide, and hollow silica particles contained in the matrix component.

3. The antireflection stack according to claim 1, wherein the water contact angle at the surface of the fourth refractive index layer is at least 90°.

4. The antireflection stack according to claim 1, wherein the fourth refractive index layer is a layer comprising magnesium fluoride.

5. The antireflection stack according to claim 4, wherein the fourth refractive index layer has an antifouling layer on the side opposite to the substrate.

6. The antireflection stack according to claim 1, which has a luminous reflectance of at most 0.2%.

7. The antireflection stack according to claim 1, wherein the first refractive index layer comprises at least one metal oxide selected from the group consisting of silicon oxide, indium oxide, tin oxide, niobium oxide, titanium oxide, zirconium oxide, cerium oxide, tantalum oxide, aluminum oxide and zinc oxide.

8. The antireflection stack according to claim 1, wherein the second refractive index layer comprises at least one metal oxide selected from the group consisting of niobium oxide, titanium oxide and silicon oxide.

9. The antireflection stack according to claim 1, wherein the third refractive index layer comprises at least one metal oxide selected from the group consisting of silicon oxide, indium oxide, tin oxide, niobium oxide, titanium oxide, zirconium oxide, cerium oxide, tantalum oxide, aluminum oxide and zinc oxide.

* * * * *